United States Patent [19]
Verbo et al.

[11] Patent Number: 5,797,264
[45] Date of Patent: Aug. 25, 1998

[54] MASTER CYLINDER AND PNEUMATIC BRAKE BOOSTER ASSEMBLY

[75] Inventors: Ulysse Verbo, Aulnay-Sous-Bois; Flavio Cobianchi, Drancy, both of France

[73] Assignee: Bosch Systems de Freinage, Drancy, France

[21] Appl. No.: 581,558

[22] PCT Filed: Dec. 13, 1995

[86] PCT No.: PCT/FR95/01666

§ 371 Date: Jan. 16, 1996

§ 102(e) Date: Jan. 16, 1996

[87] PCT Pub. No.: WO96/22209

PCT Pub. Date: Jul. 25, 1996

[30] Foreign Application Priority Data

Jan. 18, 1995 [FR] France ................... 95 00490

[51] Int. Cl.$^6$ .................................................. B60T 13/00
[52] U.S. Cl. ...................... 60/547.1; 60/403; 180/271
[58] Field of Search ........................... 60/547.1, 554, 60/403, 594, 533, 534; 180/271

[56] References Cited

U.S. PATENT DOCUMENTS 5,634,337  6/1997  Gautier et al. .................... 60/554

*Primary Examiner*—Edward K. Look
*Assistant Examiner*—Bijan N. Karimi
*Attorney, Agent, or Firm*—Leo H. McCormick, Jr.

[57] ABSTRACT

A master cylinder (12) and pneumatic brake booster (10) assembly for use in a motor vehicle. The pneumatic brake booster (10) has a casing (15) fastened to a wall (16) which separates a cabin (H) from a front compartment (C) of the motor vehicle. The pneumatic brake booster (10) is actuated by control rod (18) having a rear end which is connected to a brake pedal located in the cabin (H). The master cylinder (12) has a body (20) formed with at least one flange (22) for fastening the master cylinder (12) onto the front wall of the casing (15). An aggressive element (26) extends from the body (20) and engages the casing (15) on rotation of the master cylinder (12) in response to a torque being applied to the master cylinder (12). Engagement of the aggressive element (26) with the casing (15) will attenuate the communication of the torque into the control (18).

9 Claims, 2 Drawing Sheets

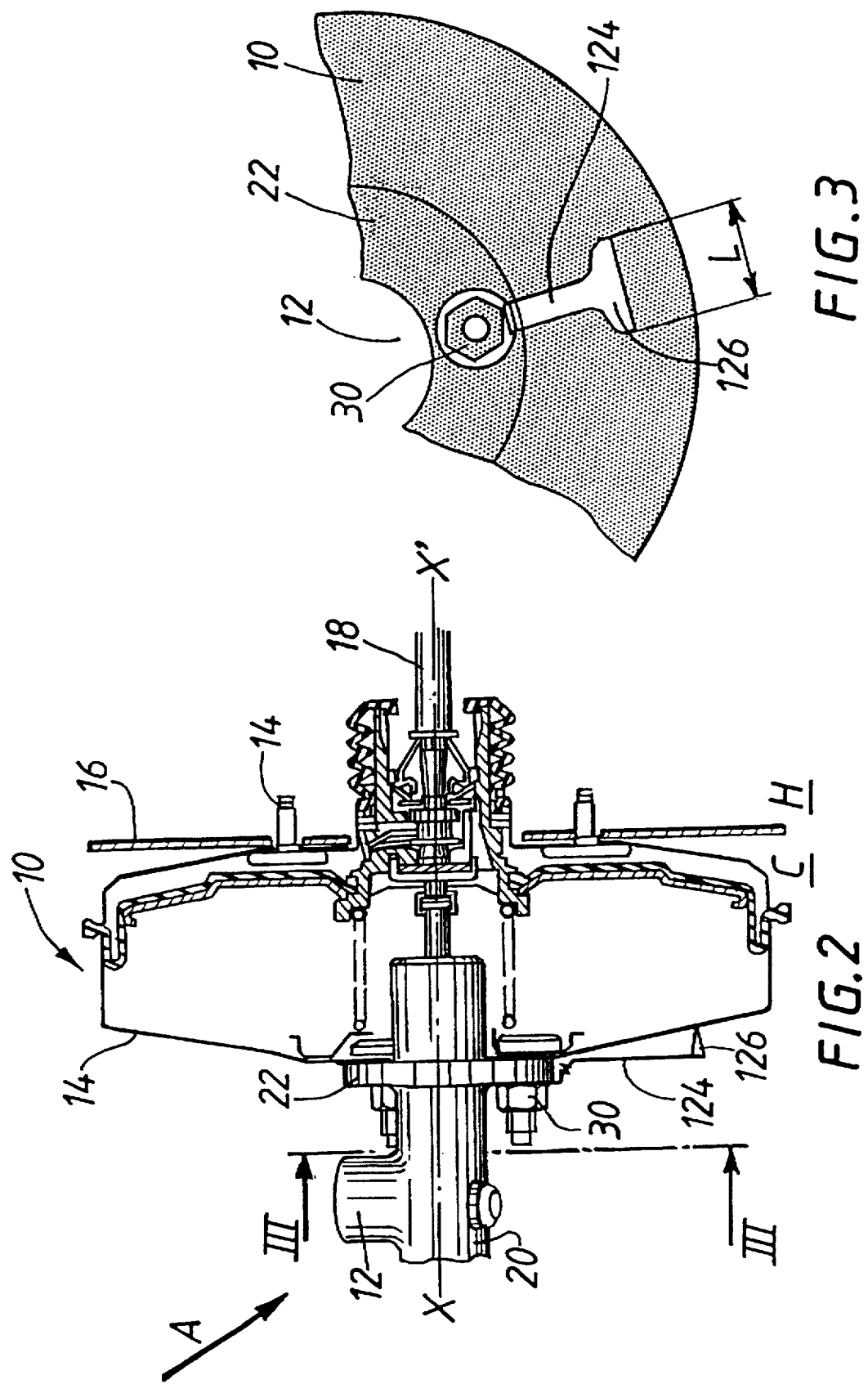

MASTER CYLINDER AND PNEUMATIC BRAKE BOOSTER ASSEMBLY

The present invention relates to braking assemblies consisting of pneumatic brake boosters and of master cylinders of the type used for braking in motor vehicles.

BACKGROUND OF THE INVENTION

Pneumatic boosters conventionally include a casing fastened to a wall separating the cabin from a front compartment of a vehicle, and are actuated by a control rod, the rear end of which is connected to a brake pedal situated in this cabin.

In parallel, master cylinders conventionally include a body formed with at least one flange for fastening the master cylinder onto the front wall of the casing of the booster.

Many documents illustrate this type of braking assembly. They are usually located in the front compartment of a motor vehicle, generally containing the engine of the vehicle, the booster being fastened via its rear wall to the bulkhead providing separation between this front compartment and the cabin, and the master cylinder being fastened to the front wall of the booster. The rod for controlling the booster passes through an opening in the bulkhead and it is actuated by a brake pedal in the cabin.

When the vehicle is involved in a frontal or almost-frontal collision with another vehicle or with a stationary obstacle, the structure and bodywork of the vehicle are designed to deform progressively in order to absorb the greatest possible proportion of the energy involved in this collision.

Nevertheless, it is often the case that the engine, or the load transported in the front compartment of the vehicle, moves back under the effect of such a collision and interferes with the master cylinder. Such interference may result in the application to the master cylinder of a force directed along its axis, or of a force forming a certain angle with its axis. However, in any case the result is that the master cylinder urges the casing of the booster backwards towards the bulkhead of the vehicle, via its fastening flanges.

It therefore follows that the consequences of a frontal or almost-frontal collision, owing to the arrangement of the booster/master cylinder assembly in the front compartment of the vehicle, are first of all to cause the bulkhead to move back under the action of the casing of the booster, regardless as to whether or not the booster is equipped with through bolts, and also of causing the brake pedal to move back, it being possible for this to cause the driver of the vehicle serious injuries.

Various documents have already attempted to provide a solution to this problem. Document FR-A-2,437,337 for example makes provision for the sector of bulkhead placed above the space where the driver places his feet to be situated as close as possible to the steering, and for the frontal sector of the bulkhead to extend forward as far as a fixed articulation point provided in the front compartment, to which point there is fastened a support which is intended to take a braking assembly as defined above, this support being shaped and arranged so that it can pivot about this stationary articulation point under the effect of a significant thrust.

Document FR-A-482,547 for its part makes provision for fastening the booster to the upper member of a shock-absorbing structure, the axis of the brake pedal being mounted at the top of the upper member which ends, via a cutout, at a larger and deformable lower member connected to the bulkhead, the lower member being shaped so that the deformation travel available at its upper part is greater than at its lower part.

These two documents of the prior art therefore essentially envisage the same solution, namely of interposing between the booster and the bulkhead a rocking or deformable structure for absorbing the energy generated during a collision. Such a solution does, however, have a significant drawback in the case where the front compartment constitutes the engine compartment of the vehicle. Indeed, in this case, the complexity of modern engines, and also the compactness of the vehicles which is desired by the car manufacturers, means that there is little or no space available in this engine compartment for accommodating additional equipment.

SUMMARY OF THE INVENTION

The object of the present invention is therefore to solve this problem, by providing a braking assembly consisting of a pneumatic booster and of a master cylinder, each being of the type recalled hereinabove, this assembly being such that interference of the engine or of the load transported in the front compartment of the vehicle with the master cylinder should not be transformed into the brake pedal being projected towards the driver of the vehicle, and that this should be the case without using additional elements which would lengthen the axial length of the braking assembly forwards of the bulkhead.

To this end, according to the present invention, such an assembly further includes at least one aggressive element for the casing of the booster when the master cylinder rotates relative to the booster under the effect of a torque applied to the master cylinder in response to the latter being acted upon strongly.

In that way, the deformation of the front wall of the booster becomes very significant, and allows the master cylinder to rotate relative to the booster also to a great extent before its effects are felt on the bulkhead of the vehicle and on the brake pedal.

Other objects, features and advantages of the present invention will emerge more clearly from the description which follows of one embodiment given by way of illustration with reference to the appended drawings.

BRIEF DESCRIPTION OF THE DRAWINGS

FIG. 2 represents a view in part section of a braking assembly produced in accordance with a second embodiment of the present invention, and FIG. 3 represents a part, plan view in the direction III—III of FIG. 2.

DETAILED DESCRIPTION OF THE INVENTION

Figure 1:
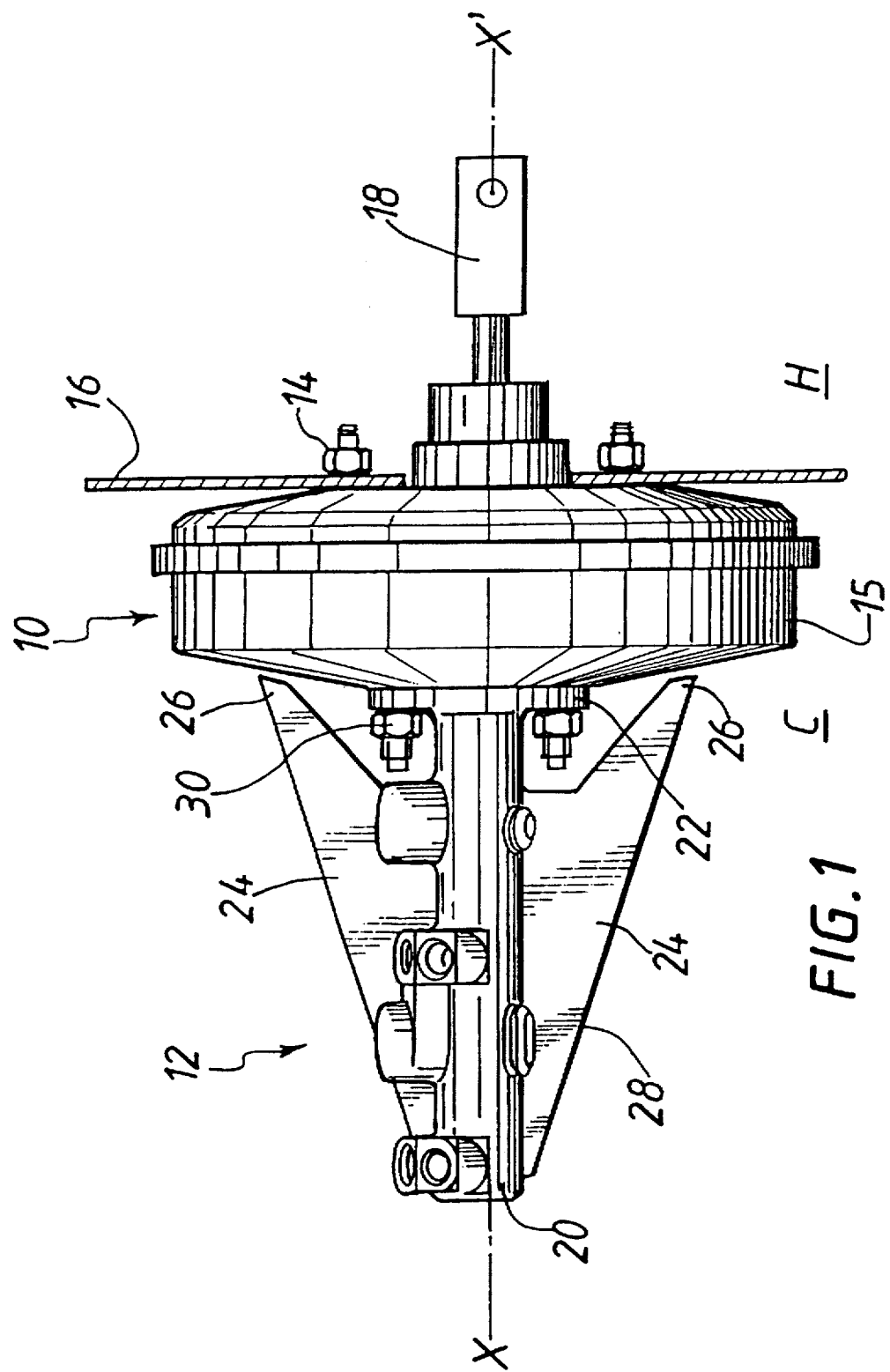
FIG. 1 represents a view of a braking assembly consisting of a pneumatic brake booster and of a master cylinder produced in accordance with the present invention.

FIG. 1 represents a view of a braking assembly, consisting of a pneumatic brake booster denoted overall by the reference 10 and of a master cylinder, denoted overall by the reference 12.

By convention, that part of the booster/master cylinder assembly which points towards the master cylinder 12 is called the "front" and that part of this assembly which points towards the cabin is called the "rear". In FIGS. 1 and 2 the front is thus to the left and the rear to the right.

The booster 10 includes a casing 15 which is designed to be fastened in the usual way by means of nuts 14 onto a bulkhead 16 providing separation between a front compartment C of a vehicle and the cabin H of this vehicle and to be actuated by a control rod 18 connected to a brake pedal (not represented) situated in this cabin. The master cylinder 12 controlling the hydraulic brake circuit of the vehicle includes a body 20 designed to be fastened to the front wall of the booster 10 via a fastening flange 22, on the axis X–X' of the booster.

The internal structure and operation of the booster and of the master cylinder are entirely conventional and do not form part of the present invention. They will therefore not be described in detail. It will merely be recalled that the booster 10 is designed to transmit to the master cylinder 12 an actuation force which is equal to the input force applied to the control rod 18 increased by a boost force generated inside the booster controlling a difference in pressure acting on the two faces of a pneumatic piston.

It is therefore understood that, in such an arrangement, which is the one most commonly used, the booster and the master cylinder are situated in the extension of one another, and that as a result, the master cylinder projects perpendicularly year bulkhead and the front end of which is situated a substantial distance from the bulkhead, it being possible for this distance to reach 40 cm for example.

It is therefore understood that, when the vehicle is involved in a collision, of being knocked violently by part of the engine or by an element of the load transported in the compartment (C).

Such an impact is therefore fully transmitted by the body 20 of the master cylinder to the casing 15 of the booster, and by the latter to the bulkhead 16 and, then again, via their internal components to the control rod 18 and finally to the brake pedal.

The present invention avoids this drawback. As has been represented in FIG. 1, the body 20 of the master cylinder 12 includes two wings 24. These wings can be cast integrally with the body of the master cylinder, or secured to this body by the appropriate method, for example welding or screwing onto the body of the master cylinder, or then again constitute a structure forcibly fitted onto the body of the master cylinder.

The wings 24 each include a rear end 26 situated, when the assembly is operational, close to the front wall of the casing 15 of the booster, for example substantially in the plane of the fastening band 22 away from the axis of symmetry X–X' of the master cylinder and of the assembly and forming a point or chamfer pointing toward the rear, that is to say toward the casing 15 of the booster, so as to form an aggressive element for this casing, in the assumption of the master cylinder being made to rotate relative to the booster following a collision.

The wings 24 may advantageously additionally include an outer edge 28 connecting the ends 26 to a region of the body 20 which is situated forwards of the plane containing these ends 26, for example at the front end of the body 20 as has been represented in FIG. 1. The wings 24 thus have the shape of the Greek letter delta.

In the event of the vehicle equipped with such a braking assembly being involved in a frontal or almost-frontal collision, the force generated by a component of the engine or an element of the load transported in the front compartment C coming to interfere with the master cylinder 12 will have the primary consequence of applying a torque to the body of the master cylinder 12 and of causing the latter to turn about an axis of rotation situated substantially in the region of the fastening flange 22.

During this rotation, one of the ends 26 of the wings 24 will first of all approach the front wall of the casing 15 of the booster then come into contact with this wall, and the aggressive shape of the end 26 will then locally deform this front wall very significantly, thus facilitating a greater rotation of the booster.

Furthermore, the pointed or chamfered shape of the end 26 gives it an even more aggressive nature toward the casing 15 of the booster if the rotation of the master cylinder continues further, and the front wall of the casing 15 will then be perforated or pierced right through, allowing the end 26 to penetrate inside the booster, and constituting the start of a tear, still further facilitating subsequent rotation of the master cylinder relative to the booster.

The wing or wings 24 will of course be arranged so that they are diametrically opposed, relative to the axis X–X', to the most probable direction from which an interference might come in the event of a collision. It will, however, be preferable to arrange three wings 24, arranged at 120 degrees about the axis X–X' so as to be sure that in all cases, at least one wing and generally two will produce the effects described hereinabove.

It will additionally be noted that for interference coming from a direction parallel to the axis X–X' or forming a slight angle with this axis, the shape of the outer edge 28 gives the wing 24 a deflector function and in this case gives the body of the master cylinder an initial rotation, with the consequences which have been described hereinabove. The profile of the outer edge 28 of the wing 24 could be straight as has been represented or, as an alternative, could be curved, concave or convex, depending on whether the rotation of the body of the master cylinder is to be favoured at the beginning or at the end of the interference with an element from the front compartment C.

It is thus easily understood that the element of the front compartment C which came to interfere with the master cylinder 12 can thus move back toward the bulkhead by a distance corresponding approximately to the length of the master cylinder forwards of the booster, without having any action either on the bulkhead or on the brake pedal. Such a distance is considered as being sufficient in the vast majority of collision cases observed.

The progressive deformation of the front wall of the casing 15 of the booster, then its perforation and tearing under the effect of the rotation of the master cylinder, additionally contribute to absorbing some of the energy of the element from the front compartment C which had come to interfere with the master cylinder.

FIGS. 2 and 3 represent a second embodiment of the invention. These figures show that the flange 22 for fastening the master cylinder includes a radial tab 124, the radially outer end 126 of which is bent backward. The rear edge is machined to form a spike, or a punch, of length L which is predetermined in the circumferential sense depending on the aggressive nature which is to be conferred upon it.

In the same way as in the previous embodiment, the end 126 is situated substantially in the plane of the fastening flange 22, close to the front wall of the casing 15 of the booster 10 and away from the axis of symmetry X–X' of the master cylinder 12 and of the booster 10.

Provision could of course be made for the tab 124 to be formed integrally with the fastening flange 22 or to be attached to the latter, for example by means of the nuts 30 used for fastening the flange 22 onto the front wall of the casing 15.

As in the previous embodiment, when the vehicle equipped with such a braking assembly is involved in a frontal or almost-frontal collision, resulting in interference with an element from the front compartment C and in a rotation of the master cylinder about an axis of rotation situated substantially in the region of the fastening flange 22, the end 126 of the tab 124 will first of all approach the front wall of the casing 15 of the booster then come into contact with it, which will then deform locally very significantly, thus facilitating greater rotation of the booster.

Likewise, the form of the end 126 machined into a punch gives it a highly aggressive nature toward the front wall of the casing 15 of the booster if the rotation of the master cylinder continues, and this front wall will then be perforated, allowing the end 126 to penetrate inside the booster and constituting the start of a tear still further facilitating additional rotation of the master cylinder relative to the booster.

This second embodiment is more particularly intended for the case where interference of a foreign element on the body of the master cylinder has a very high probability of occurring in a predetermined direction, for example in the direction of the arrow A in FIG. 2. The tab 126 will then be diametrically opposed, relative to the axis X–X', to this direction A. It will, of course, nevertheless be possible to arrange several tabs 124 secured to the fastening flange 22, in several radial directions.

It can again be seen that with this embodiment, the rotation of the master cylinder relative to the booster is facilitated, and that the element from the front compartment C which had come to interfere with the master cylinder 12 can move back by an additional distance toward the bulkhead before interacting with the bulkhead, the master cylinder in some way moving aside in its passage, and at the same time absorbing a certain amount of the energy resulting from the collision.

The second embodiment additionally has the advantage that the tab or tabs 124 could be arranged so that they are placed on the probable path of an element from the front compartment C coming to interfere with the front wall of the booster without having come into contact with the master cylinder. This element from the front compartment C will then interfere directly with a tab 124, which will also cause localized deformation of the front wall of the booster, with perforation and tearing of this wall, with the effects and advantages which have been described.

Of course the invention is not limited to the embodiments which have been described but can in contrast receive numerous modifications which will be obvious to the expert and which fall within the scope of the appended claims.

We claim:

1. A master cylinder and pneumatic brake booster assembly for use in a vehicle, a pneumatic booster including a casing fastened to a wall separating a cabin from a front compartment of the vehicle, said pneumatic booster being actuated by a control rod, said control rod having a rear end which is connected to a brake pedal situated in the cabin, a master cylinder including a body formed with at least one flange for fastening said master cylinder onto a front wall of said casing, said assembly comprising at least one aggressive element for engaging said casing of said booster on rotation of said master cylinder relative to said booster under the effect of a torque being applied to said master cylinder.

2. The assembly according to claim 1, characterized in that said master cylinder includes at least one wing having one end, said one end forming said aggressive element for engaging said casing of said booster.

3. The assembly according to claim 2, characterized in that said aggressive element of said one wing forms a point or chamfer pointing toward said casing of said booster.

4. The assembly according to claim 3, characterized in that said aggressive element of said one wing is situated close to a front wall of said casing of said booster and away from an axis of symmetry of said master cylinder.

5. The assembly according to claims 2, characterized in that said one wing includes an outer edge connecting said aggressive element to a region of said body situated forward of a plane containing said end.

6. The assembly according to claim 5, characterized in that said outer edge of said wing connects said aggressive element to a front end of said body of said master cylinder.

7. The assembly according to claim 1, characterized in that said flange for fastening said master cylinder includes at least one radial tab having a radially outer end which forms said aggressive element for said casing of said booster.

8. Assembly according to claim 7, characterized in that said aggressive element of said radial tab forms a point or a punch having a predetermined circumferential length.

9. Assembly according to claim 8, characterized in that said aggressive element of said radial tab is situated close to a front wall of said casing of said booster and away from an axis of symmetry of said master cylinder.

* * * * *